US011031739B2

United States Patent
Tseng

(10) Patent No.: US 11,031,739 B2
(45) Date of Patent: Jun. 8, 2021

(54) PROTECTIVE PLUG FOR CONNECTOR

(71) Applicant: Molex, LLC, Lisle, IL (US)

(72) Inventor: Ting-Chang Tseng, New Taipei (TW)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/931,591

(22) Filed: May 14, 2020

(65) Prior Publication Data

US 2020/0366034 A1 Nov. 19, 2020

(30) Foreign Application Priority Data

May 17, 2019 (CN) .......................... 201910414583.5

(51) Int. Cl.
*H01R 13/443* (2006.01)
*H01R 13/6591* (2011.01)
*H01R 13/52* (2006.01)
*G02B 6/42* (2006.01)

(52) U.S. Cl.
CPC ....... *H01R 13/6591* (2013.01); *H01R 13/443* (2013.01); *H01R 13/5213* (2013.01); *G02B 6/4261* (2013.01)

(58) Field of Classification Search
CPC .............. H01R 13/6591; H01R 13/443; H01R 13/5213; G02B 6/4261; G02B 2006/4297; G02B 6/3807
See application file for complete search history.

(56) References Cited

U.S. PATENT DOCUMENTS

| 7,217,146 | B2* | 5/2007 | Meister | H01R 13/443 439/148 |
| 7,462,045 | B1* | 12/2008 | Lee | H01R 13/443 439/133 |
| 10,374,349 | B2* | 8/2019 | Gustaveson | G06F 21/86 |
| 2003/0002837 | A1* | 1/2003 | Chan | G02B 6/42 385/134 |
| 2014/0305689 | A1 | 10/2014 | Reeves | |
| 2016/0093970 | A1* | 3/2016 | Wu | H01R 13/665 439/148 |

FOREIGN PATENT DOCUMENTS

| TW | 570365 U | 1/2004 |
| TW | M396517 U | 1/2011 |

* cited by examiner

*Primary Examiner* — Tho D Ta

(57) ABSTRACT

A protective plug is provided for a connector that includes a shielding cage with an insertion space therein and a front end opening communicating with the insertion space, the front end opening has a plurality of leaf springs, each leaf spring has an elastic arm extending rearwardly and inwardly, the elastic arm has a contact portion. The protective plug includes a cover body to cover the front end opening and an insertion body, the insertion body has at least one first contact surface facing the corresponding leaf spring, the first contact surface has a leaf spring acting surface portion extending forwardly and inwardly, after the protective plug is inserted to the insertion space of the shielding cage, the contact portion of the leaf spring contacts the leaf spring acting surface portion and applies a component force toward the rear to the leaf spring acting surface portion.

9 Claims, 8 Drawing Sheets

PROTECTIVE PLUG FOR CONNECTOR

RELATED APPLICATION

This application claims priority to Chinese Application Serial No. 201910414583.5, filed on May 17, 2019, which is incorporated by reference in its entirety.

TECHNICAL FIELD

The present disclosure relates to a protective plug, particularly relates to a protective plug for a connector.

BACKGROUND

Chinese invention patent application publication No. CN104112953A (corresponding to United States patent application publication No. US2014/0305689A1) discloses an integrated one-piece plug, which is used to cap or seal off an opening of an opened shielding cage and prevent electromagnetic interference (EMI) generated by electromagnetic induction effect from leaking out from the interior of the shielding cage, and a material of the plug may be plated plastic. A length or depth of a pair of elastic arms among a plurality of elastic arms of the plug is larger than a depth of a retaining tab provided at the opening of the shielding cage into the shielding cage. In order to accommodate and engage the retaining tab, the pair of elastic arms may include recesses, the recess is provided with an inner shoulder which captures a free end of the retaining tab.

However, when the plug is inserted into the shielding cage and the retaining tab falls into the recess, a gap is easily generated between the retaining tab and the recess, so that a cap member of the plug cannot reliably cap the opening of the shielding cage. Moreover, a spring force applied by the retaining tab to the plug acts on the surface of the plug only in a direction perpendicular to the inserting direction, so that a retention force of the plug in the inserting direction is insufficient, the plug is easy to skew when the plug is subjected to an improper external force, so the dustproof effect is reduced, and it is not easy for the user to feel whether the plug has been inserted into a preset position when the plug is inserted.

SUMMARY

Therefore, an object of the present disclosure is to provide a protective plug for a connector which can improve at least one of the above-mentioned disadvantages in the prior art.

Accordingly, in some embodiments, a protective plug for a connector of the present disclosure is provided. The connector comprises a shielding cage, the shielding cage has an insertion space therein and a front end opening communicated with the insertion space, the front end opening is provided with a plurality of leaf springs, each leaf spring has an elastic arm extending rearwardly and inwardly, the elastic arm has a contact portion. The protective plug comprises a cover body to cover the front end opening and an insertion body which extends rearwardly from the cover body to insert into the insertion space, the insertion body has at least one first contact surface facing the corresponding leaf spring, the first contact surface has a leaf spring acting surface portion extending forwardly and inwardly, after the protective plug is inserted to the insertion space of the shielding cage, the contact portion of the leaf spring contacts the leaf spring acting surface portion and applies a component force toward the rear to the leaf spring acting surface portion.

In some embodiments, the first contact surface further has a peak portion, the leaf spring acting surface portion is an oblique surface obliquely extending forwardly and inwardly from the peak portion, after the protective plug is completely inserted to the insertion space of the shielding cage, the contact portion of the leaf spring stops at a contact position on the leaf spring acting surface portion, and there is a predetermined distance between the contact position and the peak portion.

In some embodiments, the first contact surface further has a guiding oblique surface portion extending rearwardly and inwardly from the peak portion.

In some embodiments, the insertion body has the two first contact surfaces positioned at two opposite surfaces.

In some embodiments, the front end opening of the shielding cage is rectangular, and the leaf springs are provided at four peripheral edges of the front end opening, the insertion body of the protective plug is a rectangular column having a hollow portion therein, the insertion body further has second contact surfaces positioned on the other two opposite surfaces and facing the corresponding leaf springs.

In some embodiments, the second contact surface has an extending surface portion extending rearwardly from the cover body and a guiding oblique surface portion extending rearwardly and inwardly from the extending surface portion.

In some embodiments, an alignment block and an alignment recessed groove engaged with each other are respectively provided on the front end opening of the shielding cage and the insertion body of the protective plug.

In some embodiments, the alignment recessed groove has an enlarged entrance end into which the alignment block enters.

In some embodiments, a material of the protective plug is a polymer, and a conductive layer is provided on the surfaces of the protective plug for contacting the plurality of leaf springs.

In some embodiments, the protective plug further comprises a handle portion extending forwardly from the cover body.

In the present disclosure, the protective plug is inserted into the front end opening of the shielding cage after the corresponding leaf spring passes over the peak portion of the first contact surface, the corresponding leaf spring contacts the leaf spring acting surface portion of the protective plug, since the leaf spring acting surface portion extends forwardly and inwardly, the corresponding leaf spring will apply a component force toward the rear to the protective plug, so that the protective plug is pushed inwardly into the insertion space of the shielding cage with increased force and acceleration, thereby generating a clicking sound and a feedback feel when the user inserts the protective plug. And after the protective plug is completely inserted, the corresponding leaf spring still contacts the leaf spring acting surface portion and applies the component force toward the rear to the component protective plug to generate a retaining force, so that the cover body of the protective plug reliably seals off the front end opening of the shielding cage, and the protective plug is not easy to loosen, thereby preventing the protective plug from being skewed or loosened due to improper external force or vibration. Furthermore, the protective plug has electrical conductivity to provide dustproof and electromagnetic shielding effects.

BRIEF DESCRIPTION OF THE DRAWINGS

Other features and technical effects of the present disclosure will be apparent in the embodiments referring to the accompanying figures, in which.

DETAILED DESCRIPTION OF PREFERRED EMBODIMENTS

Figure 1:
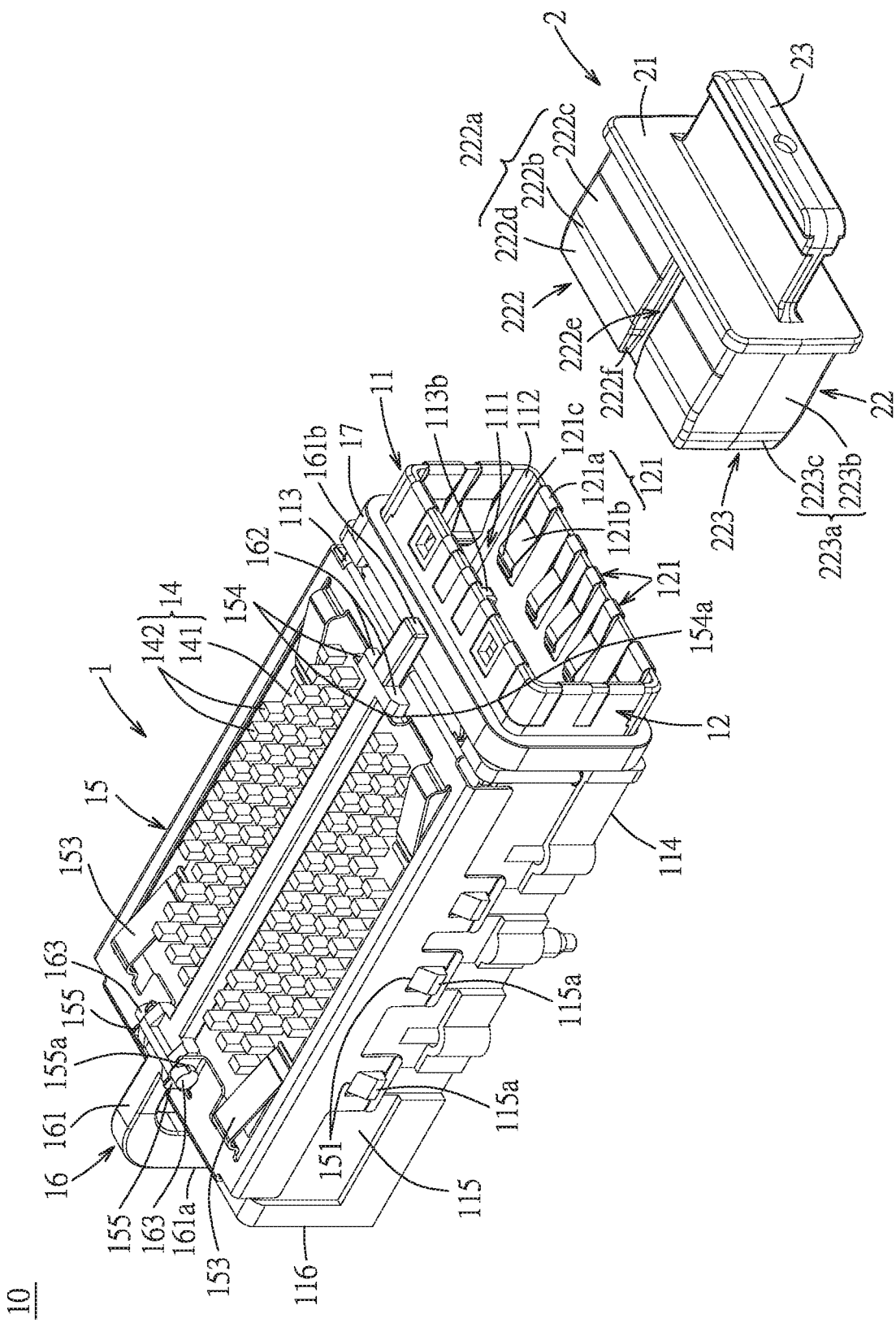
FIG. 1 is an exploded perspective view of an embodiment of an assembly of a connector and a protective plug of the present disclosure.

Before the present disclosure is described in detail, it should be noted that like elements are denoted by the same reference numerals in the following description.

Figure 2:
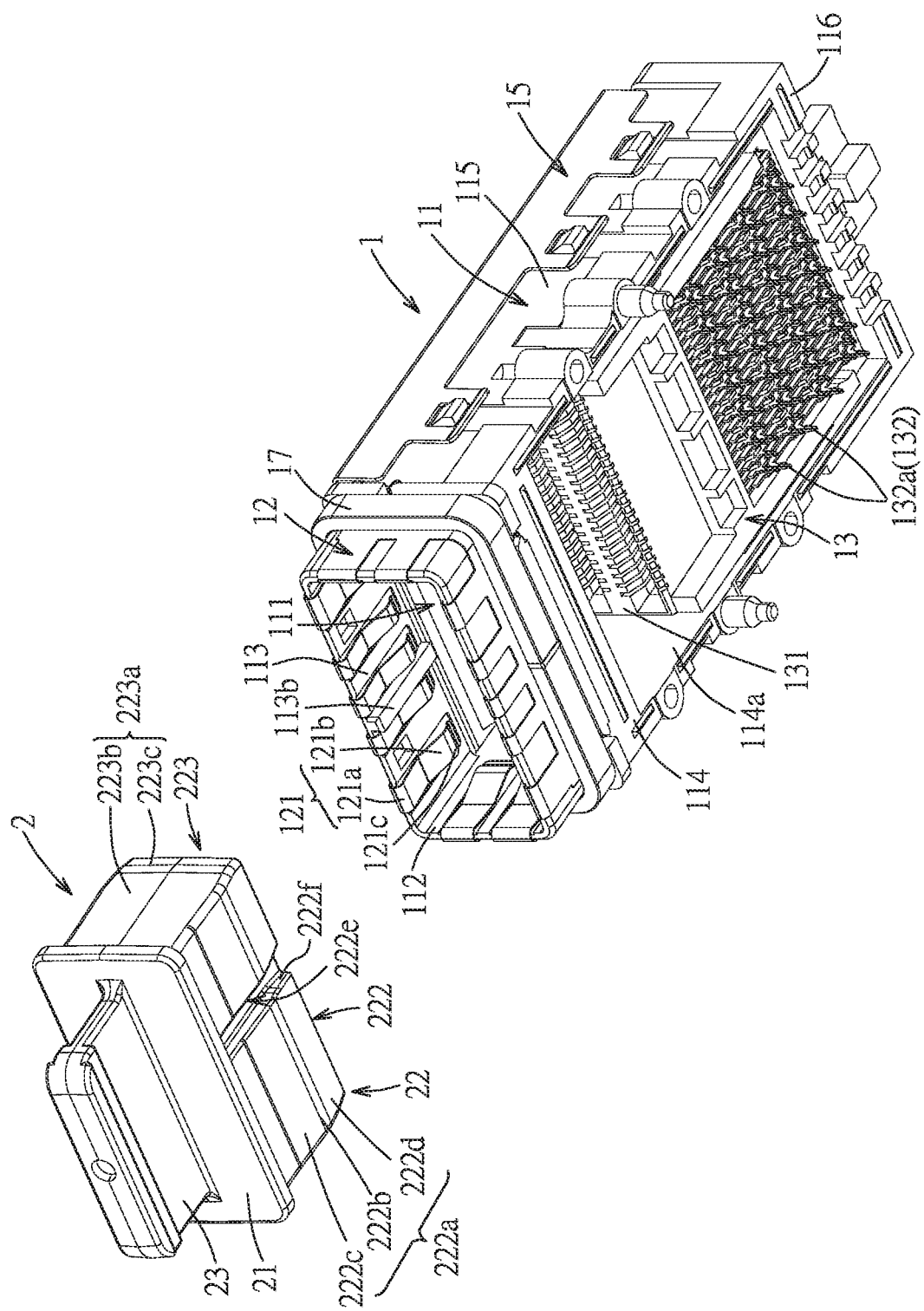
FIG. 2 is an exploded perspective view of FIG. 1 viewed from another angle.

Referring to FIG. 1 and FIG. 2, an embodiment of an assembly 10 of a connector and a protective plug of the present disclosure includes a connector 1 and a protective plug 2.

Figure 3:
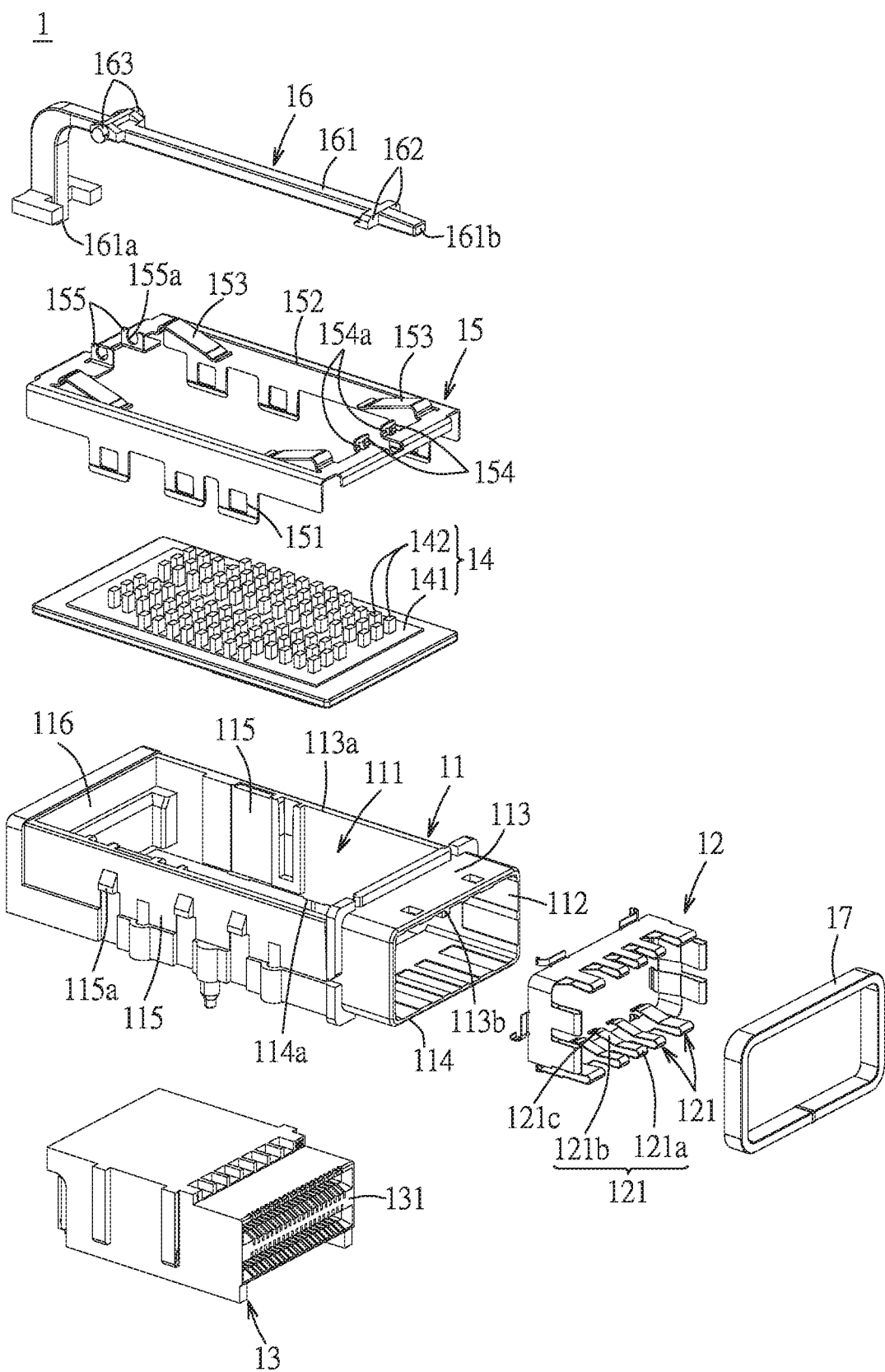
FIG. 3 is an exploded perspective view of the connector of the embodiment.
Figure 4:
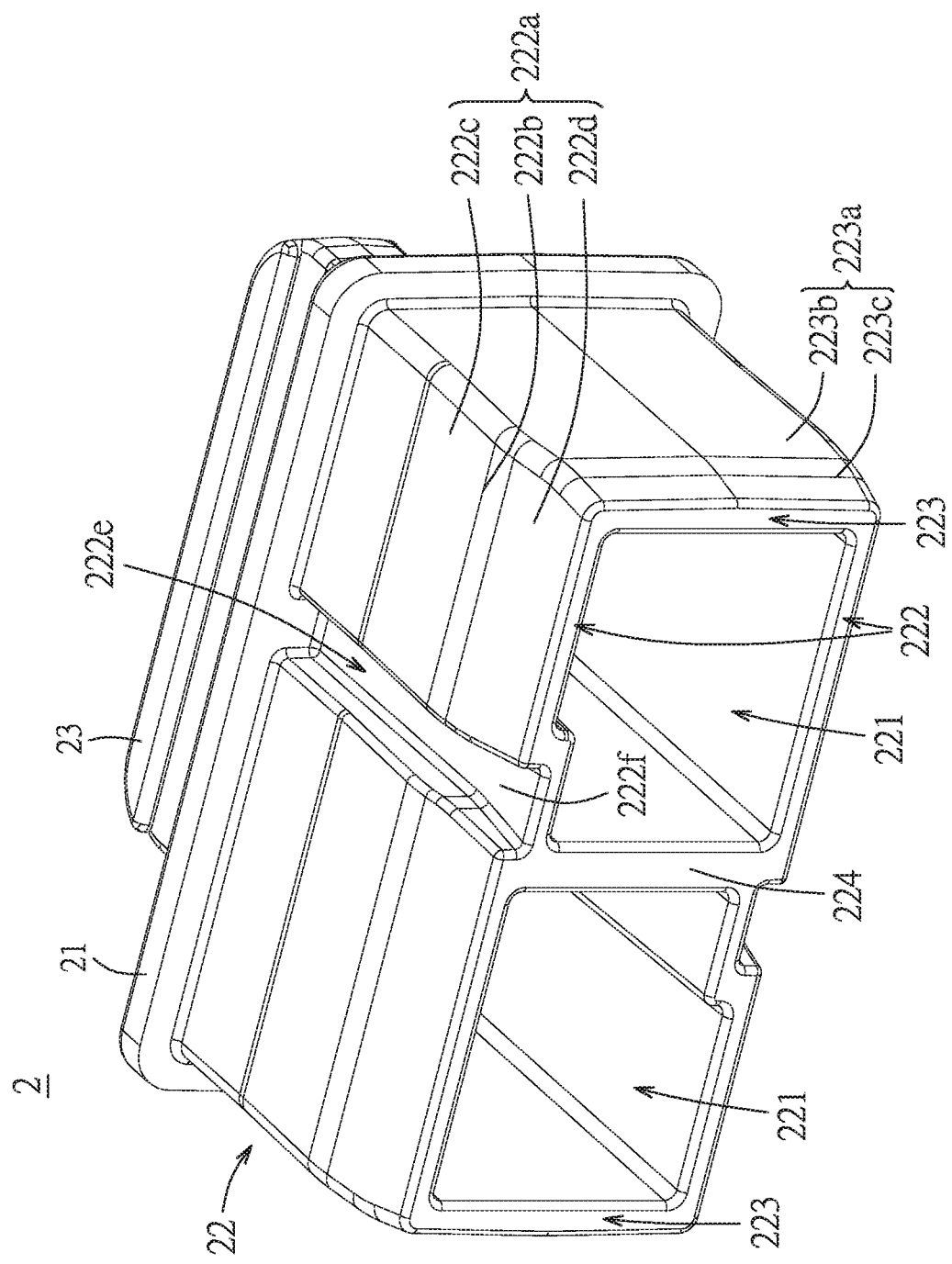
FIG. 4 is a perspective view of the protective plug of the embodiment.
Figure 5:
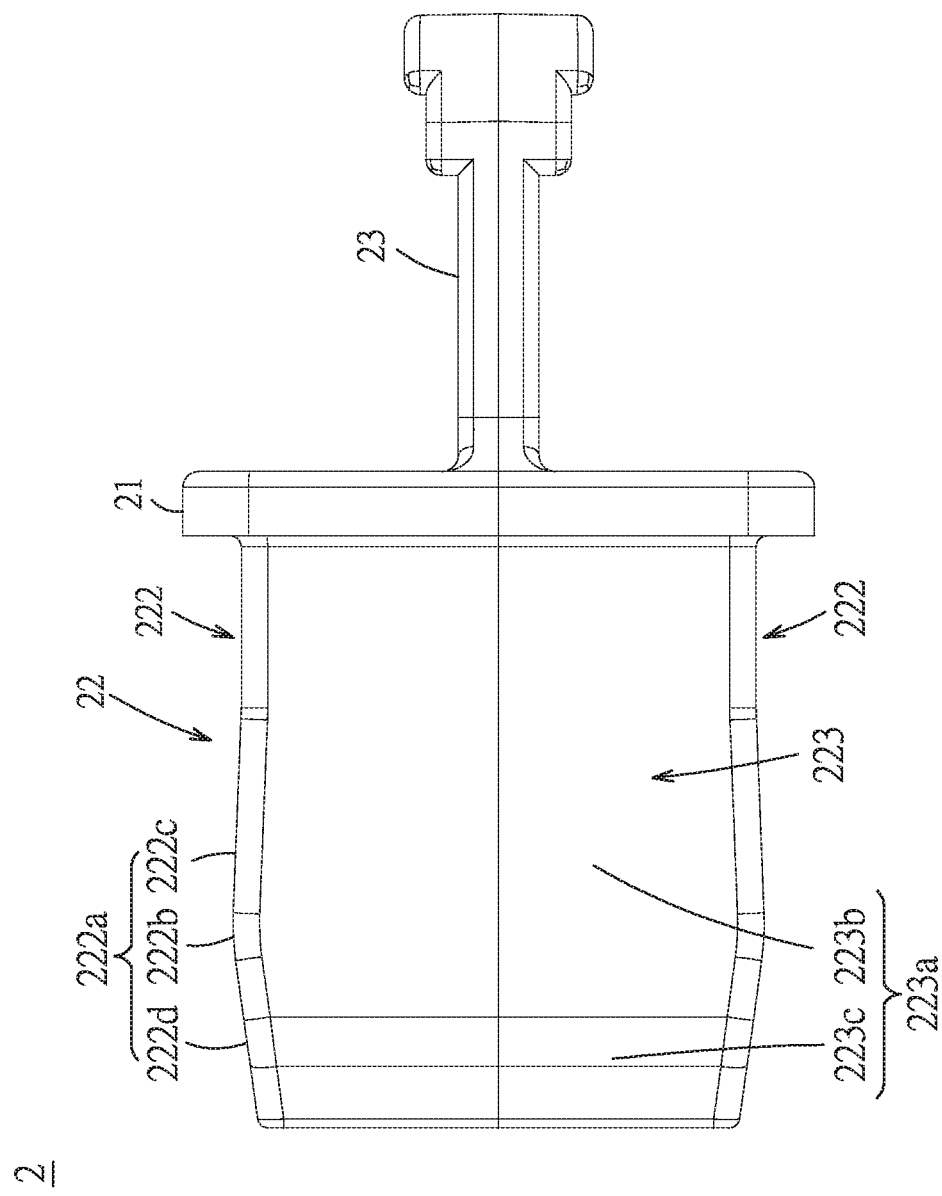
FIG. 5 is a side view of the protective plug of the embodiment.
Figure 6:
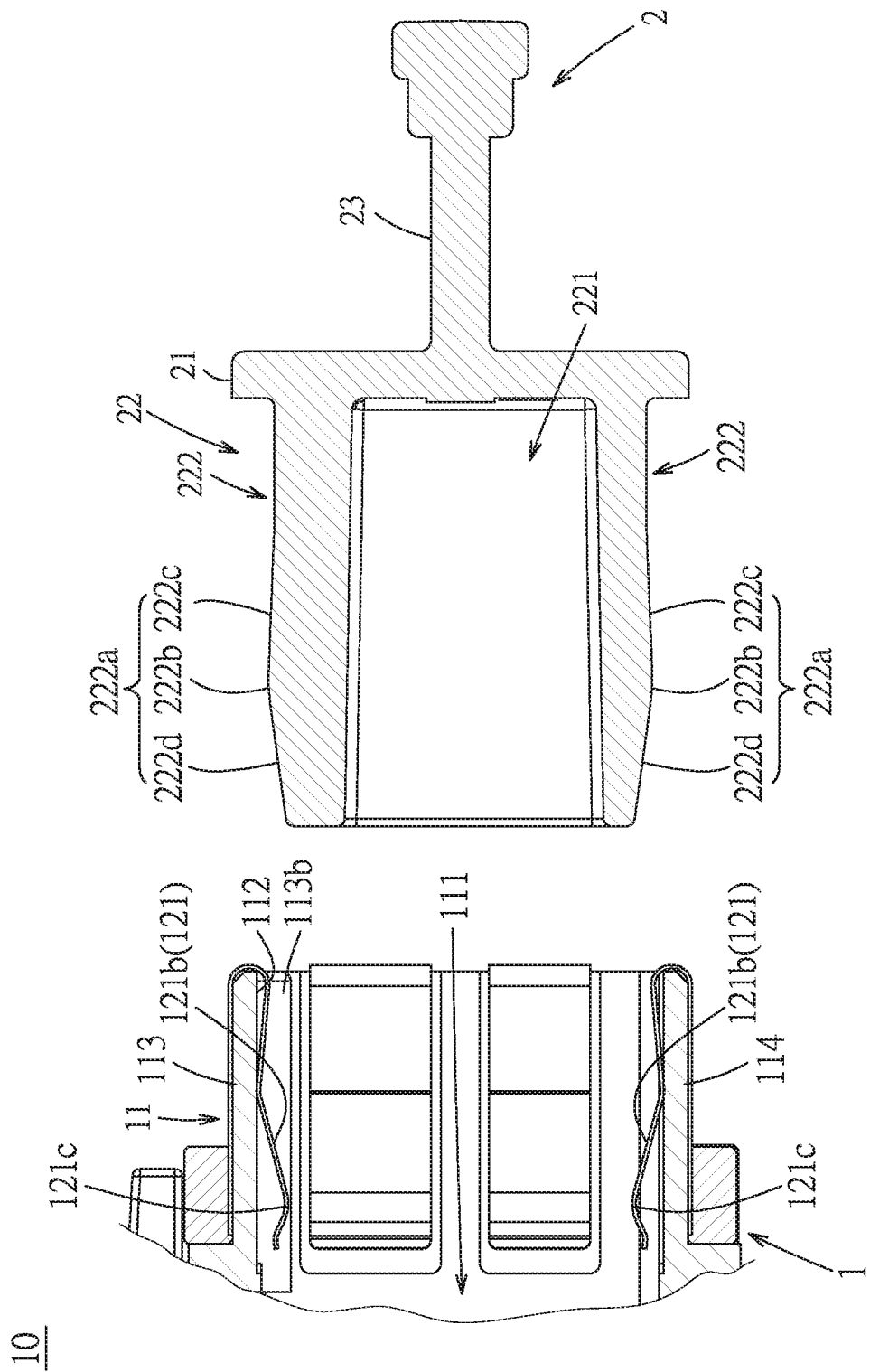
FIG. 6 is a cross-sectional view illustrating that the protective plug of the embodiment has not been inserted into the shielding cage of the connector, in which two first walls of the protective plug are sectioned.
Figure 7:
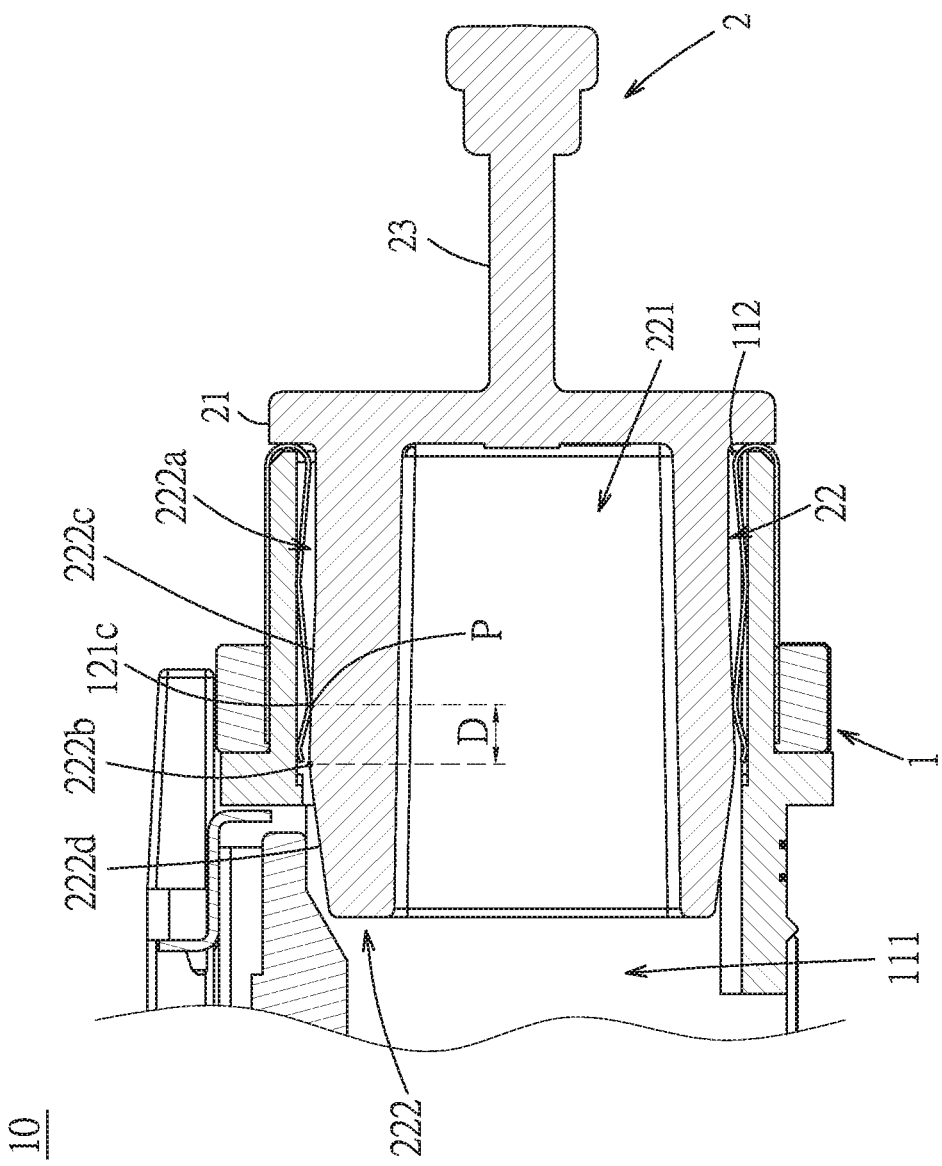
FIG. 7 is a cross-sectional view illustrating that the protective plug of the embodiment is inserted into the shielding cage of the connector, in which the two first walls of the protective plug are sectioned.
Figure 8:
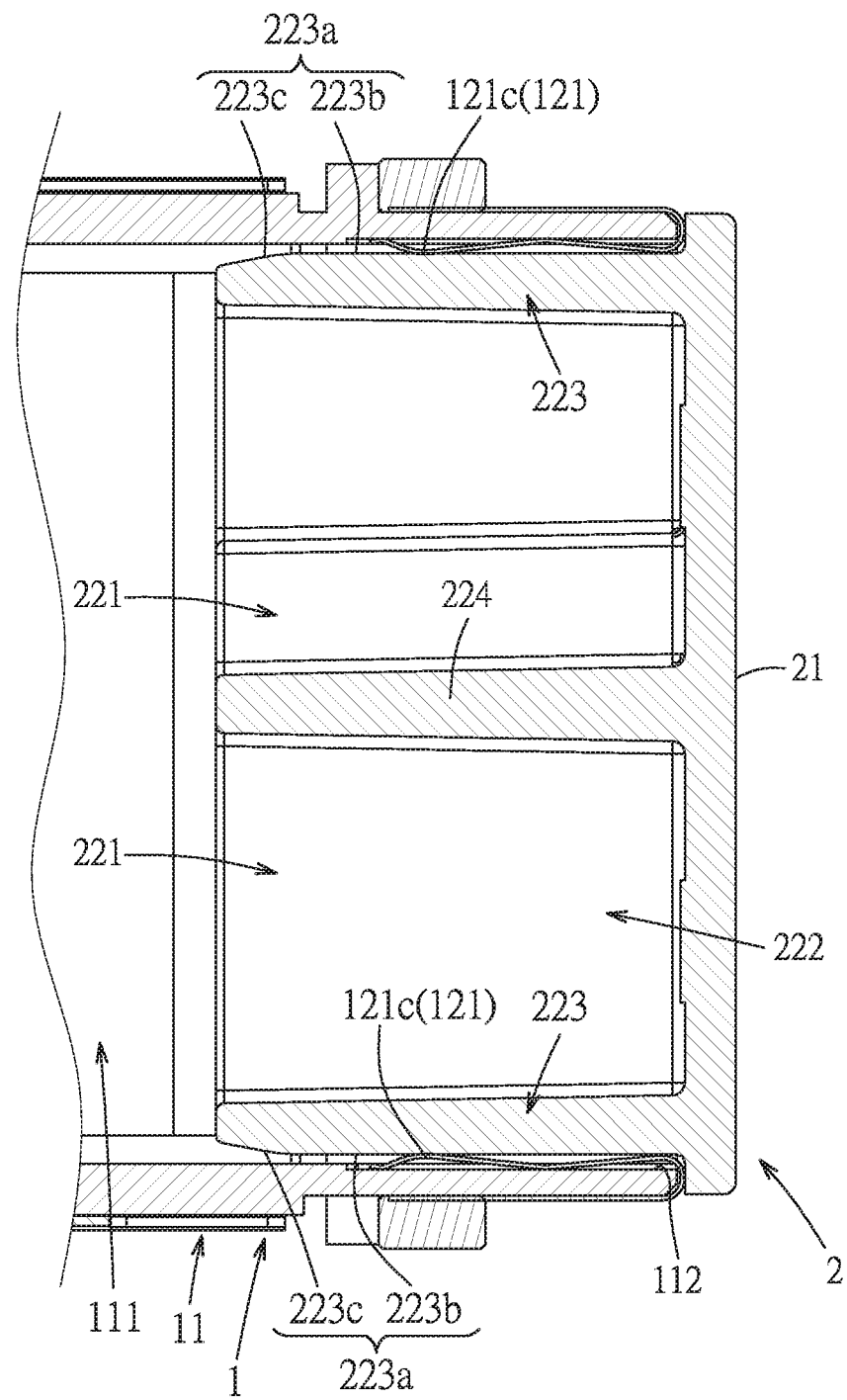
FIG. 8 is a cross-sectional view with a cutting direction different from FIG. 7, illustrating that the protective plug of the embodiment is inserted into the shielding cage of the connector, in which two second walls of the protective plug are sectioned.

Referring to FIG. 1 to FIG. 3, the connector 1 includes a shielding cage 11, a ground member 12, a receptacle 13, a heat sink 14, a clip 15, and a light pipe 16. The shielding cage 11 is made of metal, for example, and can be manufactured by metal die-casting or sheet metal forming, the shielding cage 11 has an insertion space 111 therein and a front end opening 112 communicated with the insertion space 111, in the embodiment, the shielding cage 11 has a top wall 113, a bottom wall 114, two side walls 115 connected between the top wall 113 and the bottom wall 114, and a rear wall 116 connected to rear edges of the top wall 113, the bottom wall 114 and the two side walls 115, the top wall 113, the bottom wall 114, the two side walls 115 and the rear wall 116 cooperatively define the insertion space 111 which is rectangular-parallelepiped and the front end opening 112 which is rectangular. The ground member 12 is a metal member and is fixed to the front end opening 112 of the shielding cage 11, the ground member 12 can be sheathed with a conductive ring 17, the ground member 12 has a plurality of leaf springs 121 extending into the front end opening 112, each leaf spring 121 has a bending arm 121a in which has a bending shape and abuts against the front end opening 112 of the shielding cage 11 and an elastic arm 121b which extends rearwardly and inwardly from a distal end of the bending arm 121a, the elastic arm 121b has a contact portion 121c, and in the embodiment, the leaf springs 121 are disposed at four peripheral edges of the front end opening 112. The receptacle 13 is provided in a rear segment inside the insertion space 111 of the shielding cage 11, the receptacle 13 has a housing formed with a mating surface 131 facing forwardly, and the housing of the receptacle 13 is provided with a plurality of conductive terminals 132 therein, tail portions 132a of the conductive terminals 132 extend out through a bottom opening 114a formed by the bottom wall 114 of the shielding cage 11 and are used to be soldered to a circuit board (not shown). The heat sink 14 has a plate body 141 which is provided to a top opening 113a formed on the top wall 113 of the shielding cage 11 and has a bottom surface to extend into the insertion space 111 and a plurality of heat dissipating fins 142 which extends upwardly from the plate body 141. The clip 15 is provided on the top wall 113 of the shielding cage 11 and is used to elastically press against the heat sink 14, the two side walls 115 of the shielding cage 11 are formed with a plurality of locking blocks 115a, the clip 15 has a plurality of locking holes 151 locked with the locking blocks 115a, an opening 152 through which the heat dissipating fins 142 of the heat sink 14 pass, and a plurality of elastic pressing pieces 153 extending out of a periphery of the opening 152 and pressing against the plate body 141 of the heat sink 14. The light pipe 16 is provided to the clip 15, specifically, the clip 15 further has two first mounting portions 154 positioned at a front end edge of the opening 152 and two second mounting portions 155 positioned at a rear end edge of the opening 152, each first mounting portion 154 is formed with a latching hole 154a, each second mounting portion 155 is formed with a mortise 155a, the light pipe 16 has a pipe body 161 and two latching columns 162 and two tenons 163 extending from the pipe body 161, the pipe body 161 has a light-enter end 161a for aligning a light emitting element (not shown) of the circuit board (not shown) for light to enter therein and a light-exit end 161b opposite to the light-enter end 161a and for the light to exit therefrom, the two latching columns 162 are latched with the two latching holes 154a of the two first mounting portions 154, and the two tenons 163 joint the mortises 155a of the two second mounting portions 155, so that the light pipe 16 is fixed to the clip 15.

Referring to FIG. 1, FIG. 2 and FIG. 4 to FIG. 7, the protective plug 2 includes a cover body 21 which can cover the front end opening 112 of the shielding cage 11, an insertion body 22 which extends rearwardly from the cover body 21 to insert into the insertion space 111 of the shielding cage 11, and a handle portion 23 extending forwardly from the cover body 21 and having a flat strip shape for the user to grasp. In the embodiment, a material of the protective plug 2 is a polymer (such as plastic, plastic which can be plated, liquid crystal polymer (LCP) material, etc.), and a surface of the protective plug 2 is provided with a conductive layer (not shown) for contacting the leaf springs 121, thereby enabling the protective plug 2 to have an electrical conductivity to provide dustproof and electromagnetic shielding functions at the same time. In the embodiment, the insertion body 22 is a rectangular column so as to correspond to the front end opening 112 of the shielding cage 11, and a hollow portion 221 opening rearwardly is provided inside the insertion body 22, thereby reducing the weight of the protective plug 2. Specifically, the insertion body 22 has two first walls 222 respectively positioned above and below, two second walls 223 spaced apart from each other and connected to side edges of the first walls 222 and a connecting wall 224 connected to centers of the first walls 222 to strengthen the structural strength of the insertion body 22, the two first walls 222, the two second walls 223 and the connecting wall 224 cooperatively define the two hollow portions 221. Each first wall 222 has a first contact surface 222a facing the corresponding leaf spring 121, the first contact surfaces 222a of the first walls 222 are positioned at two opposite surfaces of the insertion body 22. Each first contact surface 222a has a peak portion 222b, a leaf spring acting surface portion 222c obliquely extending forwardly and inwardly from the peak portion 222b and having an oblique surface shape, and a guiding oblique surface portion 222d extending rearwardly and inwardly from the peak portion 222b. During the insertion of the insertion body 22 of the protective plug 2 into the insertion space 111 from the front end opening 112 of the shielding cage 11, the contact portion 121c of the corresponding leaf spring 121 contacts the guiding oblique surface portion 222d, the insertion body 22 of the protective plug 2 gradually compresses the leaf spring 12 during insertion through the guiding oblique surface portion 222d extending obliquely, the corresponding leaf spring 121 reaches the maximum compression amount when the contact portion 121c reaches the peak portion 222b, and then after the corresponding leaf spring 121 passes over the peak portion 222b, the contact portion 121c of the corresponding leaf spring 121 contacts the leaf spring acting surface portion 222c and applies a component force toward the rear to the leaf spring acting surface portion 222c, so that the protective plug 2 is pushed inwardly into the insertion space 111 of the shielding cage 11 with increased force and acceleration until the cover body 21 covers the front end opening 112 of the shielding cage 11 and stops, thereby generating a clicking sound and feedback feel when the user inserts the protective plug. And after the protective plug 2 is completely inserted, the contact portion 121c of the corresponding leaf spring 121 stops at a contact position P on the leaf spring acting surface portion 222c, and there is a predetermined distance D between the contact position P and the peak portion 222b, so that the corresponding leaf spring 121 still contacts the leaf spring acting surface portion 222c and applies the component force toward the rear to the protective plug 2 to generate a retaining force, so that the protective plug 2 is not easy to loosen, thereby preventing the protective plug 2 from being skewed or loosened due to improper external force or vibration.

Referring to FIG. 1, FIG. 2, FIG. 4 and FIG. 8, each second wall 223 has a second contact surface 223a facing the corresponding leaf spring 121, the second contact surfaces 223a of the second walls 223 are respectively positioned on the other two opposite surfaces of the insertion body 22 and connected between the first contact surfaces 222a. Each second contact surface 223a has an extending surface portion 223b extending rearwardly from the cover body 21 and a guiding oblique surface portion 223c extending rearwardly and inwardly from the extending surface portion 223b. During the insertion of the insertion body 22 of the protective plug 2 into the insertion space 111 of the shielding cage 11, the contact portion 121c of the corresponding leaf spring 121 contacts the guiding oblique surface portion 223c. After the protective plug 2 is inserted into the insertion space 111 of the shielding cage 11, the contact portion 121c of the corresponding leaf spring 121 contacts the extending surface portion 223b. It should be noted that, in other varied embodiments, the second contact surface 223a may be configured as the first contact surface 222a, which is not limited by this embodiment. In addition, in the embodiment, the top wall 113 of the shielding cage 11 is provided with an alignment block 113b at the front end opening 112, and the first contact surfaces 222a of the two first walls 222 of the insertion body 22 of the protective plug 2 each are provided with an alignment recessed groove 222e which is engaged with the alignment block 113b, thereby allowing the alignment block 113 and the alignment recessed groove 222e to be easily aligned with each other when the protective plug 2 is inserted to the shielding cage 11, and since the first walls 222 are both formed with the alignment recessed grooves 222e, the protective plug 2 can still be inserted into the shielding cage 11 even if it is reversed 180 degrees. And each alignment recessed groove 222e has an enlarged entrance end 222f into which the alignment block 113b enters, thereby enabling the protective plug 2 to be inserted into the shielding cage 11 more easily. In addition, it should be noted that, in a varied embodiment, the alignment block 113b may also be provided on the insertion body 22 of the protective plug 2, and in this case, the alignment recessed groove 222e is provided on the front end opening 112 of the shielding cage 11.

In conclusion, the protective plug 2 in the present disclosure is inserted into the front end opening 112 of the shielding cage 11 and after the corresponding leaf spring 121 passes over the peak portion 222b of the first contact surface 222a, the corresponding leaf spring 121 contacts the leaf spring acting surface portion 222c of the protective plug 2, since the leaf spring acting surface portion 222c extends forwardly and inwardly, the corresponding leaf spring 121 will apply a component force toward the rear to the protective plug 2, so that the protective plug 2 is pushed inwardly into the insertion space 111 of the shielding cage 11 with increased force and acceleration, thereby generating a clicking sound and a feedback feel when the user inserts the protective plug 2. And after the protective plug 2 is completely inserted, the corresponding leaf spring 121 still contacts the leaf spring acting surface portion 222c and applies the component force toward the rear to the component protective plug 2 to generate a retaining force, so that the cover body 21 of the protective plug 2 reliably seals off the front end opening 112 of the shielding cage 11, and the protective plug 2 is not easy to loosen, thereby preventing the protective plug 2 from being skewed or loosened due to improper external force or vibration. Furthermore, the protective plug 2 has electrical conductivity to provide dust-proof and electromagnetic shielding effects.

However, the above description is only for the embodiments of the present disclosure, and it is not intended to limit the implementing scope of the present disclosure, and the equivalent changes and modifications made according to the claims and the contents of the specification are still included in the scope of the present disclosure.

The invention claimed is:

1. A protective plug for a connector comprising a shielding cage, the shielding cage having an insertion space therein and a front end opening in communication with the insertion space, the front end opening being provided with a plurality of leaf springs, each leaf spring having an elastic arm extending rearwardly and inwardly, the elastic arm having a contact portion, the protective plug comprising:
    a cover body to cover the front end opening; and
    an insertion body that extends rearwardly from the cover body for insertion into the insertion space, the insertion body having at least one first contact surface facing the corresponding leaf spring, the first contact surface having a leaf spring acting surface portion extending forwardly and inwardly,
    when the protective plug is inserted to the insertion space of the shielding cage, the contact portion of the leaf spring contacts the leaf spring acting surface portion and applies a component force toward the rear to the leaf spring acting surface portion, wherein the first contact surface further has a peak portion. the leaf spring acting surface portion is an oblique surface obliquely extending forwardly and inwardly from the peak portion, after the protective plug is completely inserted to the insertion space of the shielding cage, the contact portion of the leaf spring stops at a contact position on the leaf spring acting surface portion, and there is a predetermined distance between the contact position and the peak portion.

2. The protective plug of claim 1, wherein the protective plug further comprises a handle portion extending forwardly from the cover body.

3. The protective plug of claim 1, wherein the first contact surface further has a guiding oblique surface portion extending rearwardly and inwardly from the peak portion.

4. The protective plug of claim 3, wherein the insertion body has the two first contact surfaces positioned at two opposite surfaces.

5. The protective plug of claim 4, wherein the front end opening of the shielding cage is rectangular, and the leaf springs are provided at four peripheral edges of the front end opening, the insertion body of the protective plug is a rectangular column having a hollow portion therein, the insertion body further has second contact surfaces positioned on the other two opposite surfaces and facing the corresponding leaf springs.

6. The protective plug of claim 5, wherein the second contact surface has an extending surface portion extending rearwardly from the cover body and a guiding oblique surface portion extending rearwardly and inwardly from the extending surface portion.

7. The protective plug of claim 5, wherein a material of the protective plug is a polymer, and a conductive layer is provided on the surfaces of the protective plug for contacting the plurality of leaf springs.

8. The protective plug of claim 5, wherein an alignment block and an alignment recessed groove engaged with each other are respectively provided on the front end opening of the shielding cage and the insertion body of the protective plug.

9. The protective plug of claim 8, wherein the alignment recessed groove has an enlarged entrance end into which the alignment block enters.

\* \* \* \* \*